United States Patent [19]

Garrison

[11] 4,038,880
[45] Aug. 2, 1977

[54] DRIVE TRAIN AND TRANSMISSION FOR FORAGE HARVESTER

[75] Inventor: Harold Keith Garrison, Newton, Kans.

[73] Assignee: Hesston Corporation, Hesston, Kans.

[21] Appl. No.: 627,055

[22] Filed: Oct. 30, 1975

[51] Int. Cl.² .................. F16H 7/12; F16H 7/10; A01D 69/10; A01D 69/08

[52] U.S. Cl. .................. 74/242.1 R; 56/11.3; 56/11.6; 74/242.15 R

[58] Field of Search .............. 56/11.6, 11.3, 11.2, 56/11.8, 10.8; 74/242.1 R, 242.15 R

[56] References Cited

U.S. PATENT DOCUMENTS

| | | | |
|---|---|---|---|
| 3,440,740 | 4/1969 | Kamlukin | 56/11.6 X |
| 3,528,231 | 9/1970 | Keller et al. | 56/11.3 |
| 3,766,722 | 10/1973 | Kamlukin et al. | 56/11.6 |
| 3,782,085 | 1/1974 | Parker et al. | 56/11.6 |
| 3,938,400 | 2/1976 | Konyha | 74/242.1 R |

Primary Examiner—Leonard H. Gerin
Attorney, Agent, or Firm—Schmidt, Johnson, Hovey & Williams

[57] ABSTRACT

A belt transmission has a clutch that keeps both belts moving in the same direction when the transmission is in the forward mode and slackens only one of the belts during the usually brief interval that the transmission is placed in its reverse mode with the other belt moving in the reverse direction. Both belts share a common actuating lever having a lost motion coupling with one of the belts so that the lever can be placed in a neutral position in which neither of the belts is driven, even though power continues to be delivered to the transmission. The drive train that supplies such power accomplishes a substantially right-angle drive from the swingable tongue of the machine without a gear box by connecting a number of universal joints in a series that cuts across the corner between the swingable tongue and the main driven shaft of the transmission.

19 Claims, 14 Drawing Figures

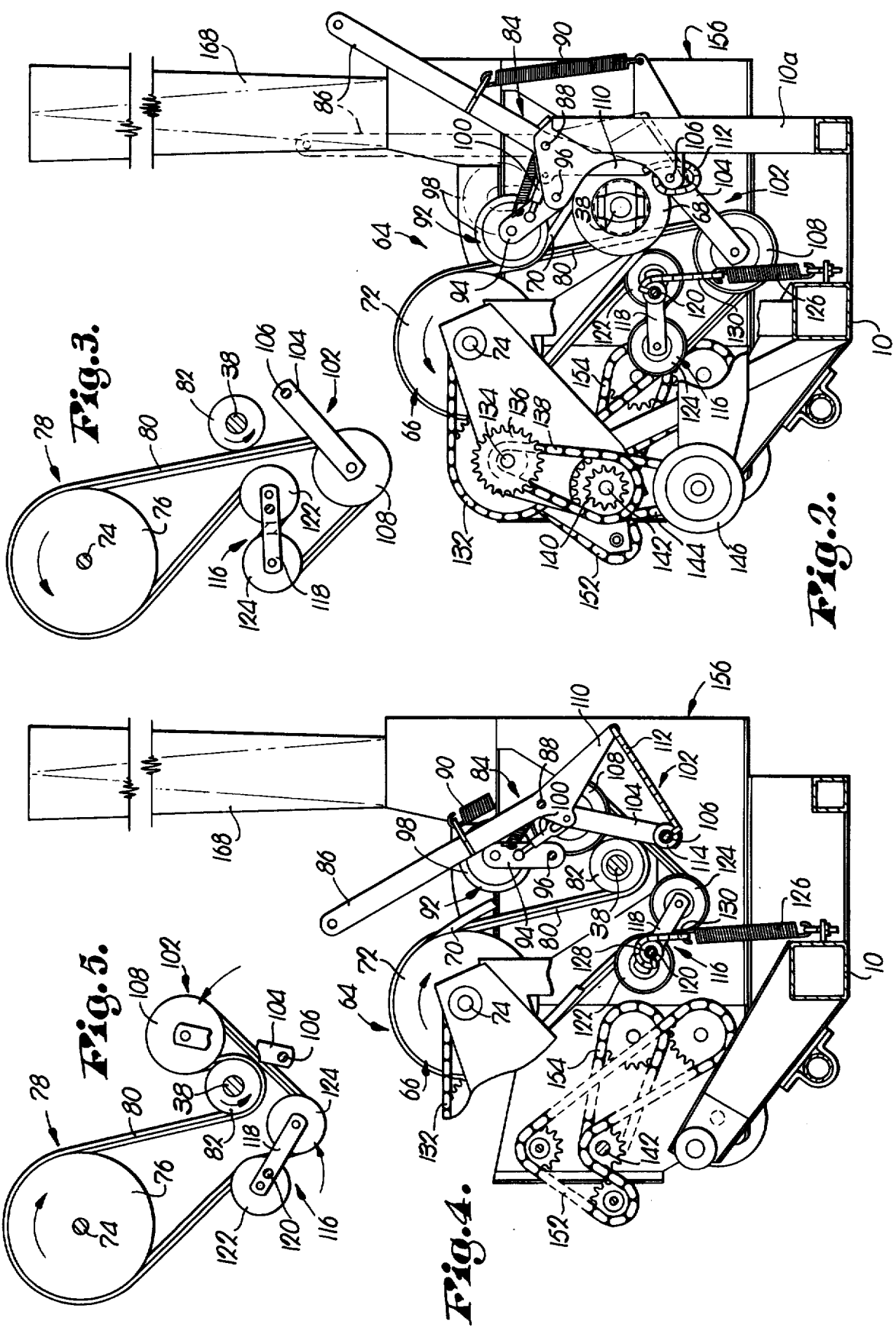

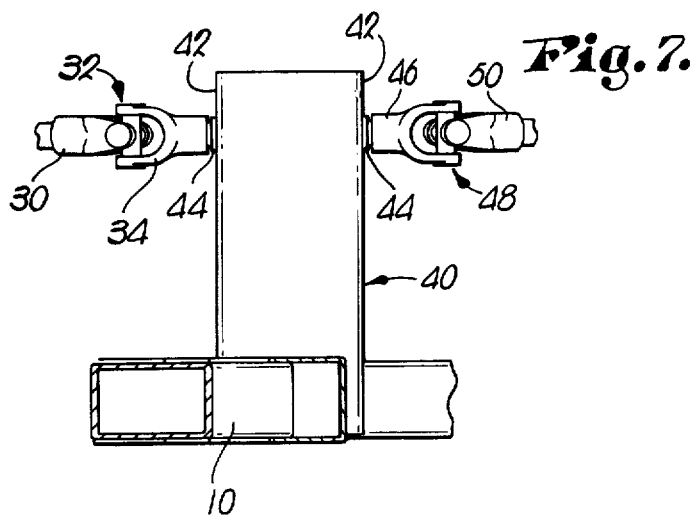
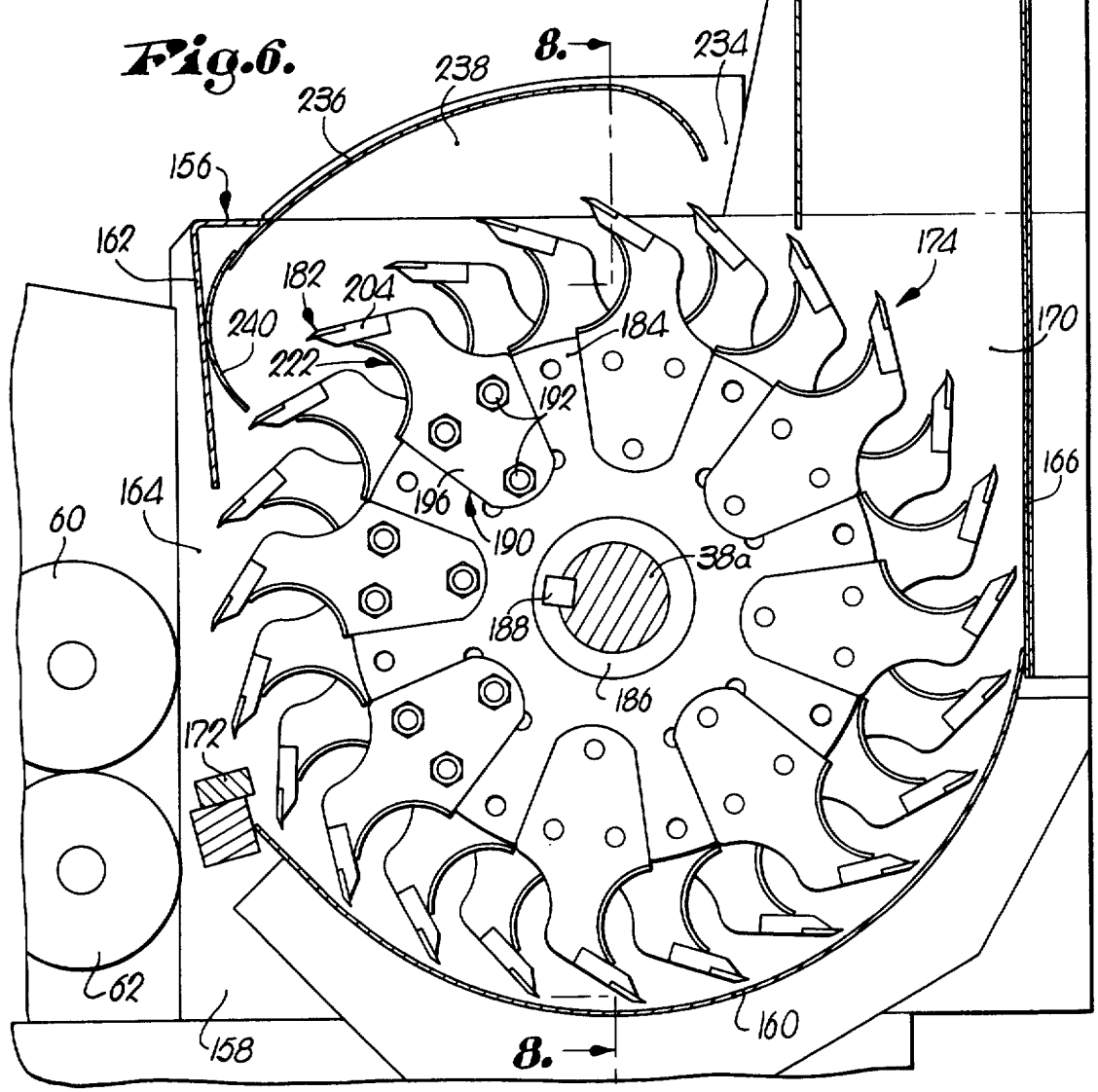

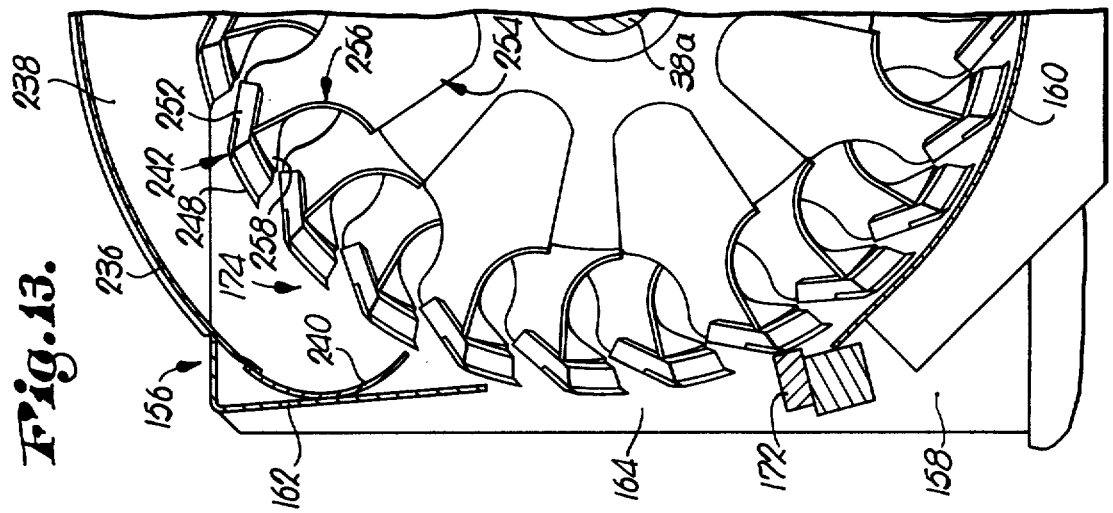
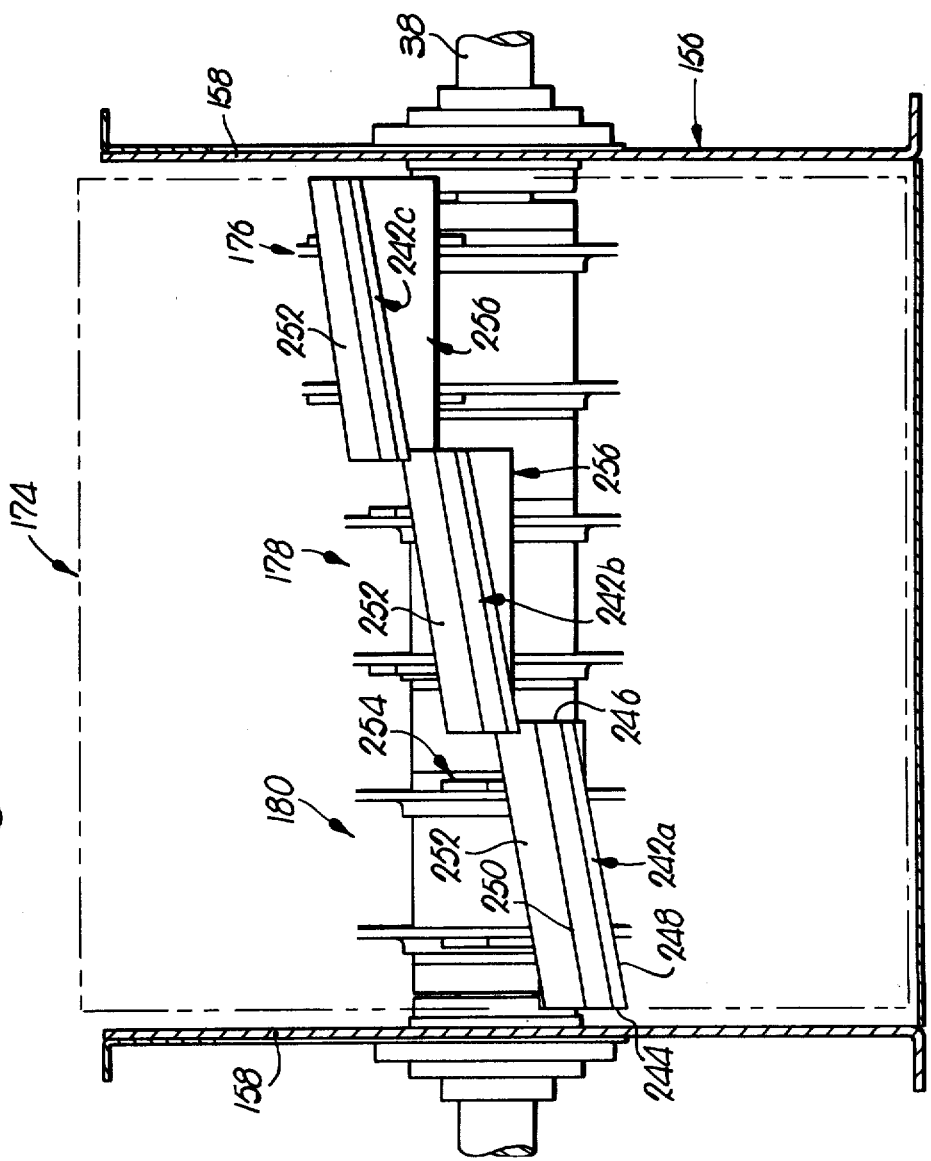

DRIVE TRAIN AND TRANSMISSION FOR FORAGE HARVESTER

The drive train and power transmission on agricultural machines such as forage harvesters have always been sources of relatively great expense and mechanical shortcoming because of the need to turn a sharp corner with the drive line as it comes into the machine along its swingable tongue and because of the dirty, trash-laden conditions under which such machines must normally operate.

Right-angle gear boxes are quite expensive, but have heretofore been used prolifically in order to make the required right angle turn into the driven apparatus of the machine. Similarly, chain, sprocket and gear transmissions utilizing casings around critical components to shield the latter from stalks, leaves and other crop residue during harvesting also add considerably to the expense of such machines. Belt transmissions provide a lower cost alternative, but they too can be adversely affected by an accumulation of debris in their vital components.

In many of such belt transmissions, the practice is to permit one belt to idle loosely about a pair of spinning pulleys while another belt is tensioned about other spinning pulleys in such a way that the apparatus is driven in what may be termed a "forward" mode. To shift the transmission into a "reverse" mode, tension on the forwardly moving belt is relaxed to allow it to idle loosely around its spinning pulleys while tension on the other belt is increased so that it now becomes driven in the reverse direction by its pulleys. This arrangement, however, provides an inviting area for trash to accumulate, since the loose belt has space between itself and its pulleys within which the trash can become lodged. While the tight and swiftly moving belt can readily shed itself of accumulated trash, the stationary belt cannot, and as the trash builds up, the loose belt becomes tighter and tighter until it tries to drive the apparatus in the direction opposite to that which it is already being driven by the other, trashfree belt.

Accordingly, one important object of the present invention is to provide a reversible, belt-type power transmission which while offering decreased cost compared to chain, sprocket and gear type transmissions, nonetheless avoids the problems of trash accumulation in its vital components such as experienced by prior belt transmissions.

Another important object of this invention is to provide a way in which single actuating lever may be used to control clutching of both belts of the transmission, even though one of the belts continuously moves either in forward or reverse, and the second belt must be either tensioned or relaxed depending upon whether the transmission is in forward or reverse mode.

An additional important object of the invention is to provide the foregoing and yet permit the transmission to be placed in a neutral condition wherein power continues to be supplied to the transmission but its belts are both idle.

A further important object of the present invention is the elimination of an expensive, right-angle gear box in the drive train leading to the power transmission by virtue of a flexible drive line consisting of a number of universal joints coupled in series between the drive shaft carried by the swingable tongue of the machine and the power transmission.

In the drawings:

FIG. 2 is a vertical, cross-sectional view of the power transmission taken substantially centrally of the machine with the transmission in its forward mode, the phantom lines indicating the position of the actuating lever when the latter is disposed for the neutral mode;

FIG. 3 is a schematic illustration of one power train of the transmission when the latter is in its forward mode as illustrated in FIG. 2;

FIG. 4 is a vertical cross-sectional view of the transmission taken slightly closer to the cutting housing than FIG. 2 and illustrating the condition of the transmission when the latter is in its reverse mode;

FIG. 5 is a schematic illustration of the same power train shown in FIG. 3 but in its reverse mode corresponding to FIG. 4;

FIG. 6 is an enlarged, fragmentary vertical cross-sectional view through the cutting chamber of the machine;

FIG. 7 is a vertical cross-sectional view through the power train of the machine taken substantially along line 7—7 of FIG. 1;

FIG. 13 is a fragmentary, vertical cross-sectional view through the cutting chamber illustrating an arrangement wherein the knife segments are disposed obliquely with respect to the axis of rotation of the cylinder instead of parallel to such axis as in FIGS. 1–12; and FIG. 14 is a partial frontal view thereof.

THE DRIVE TRAIN

Figure 1:
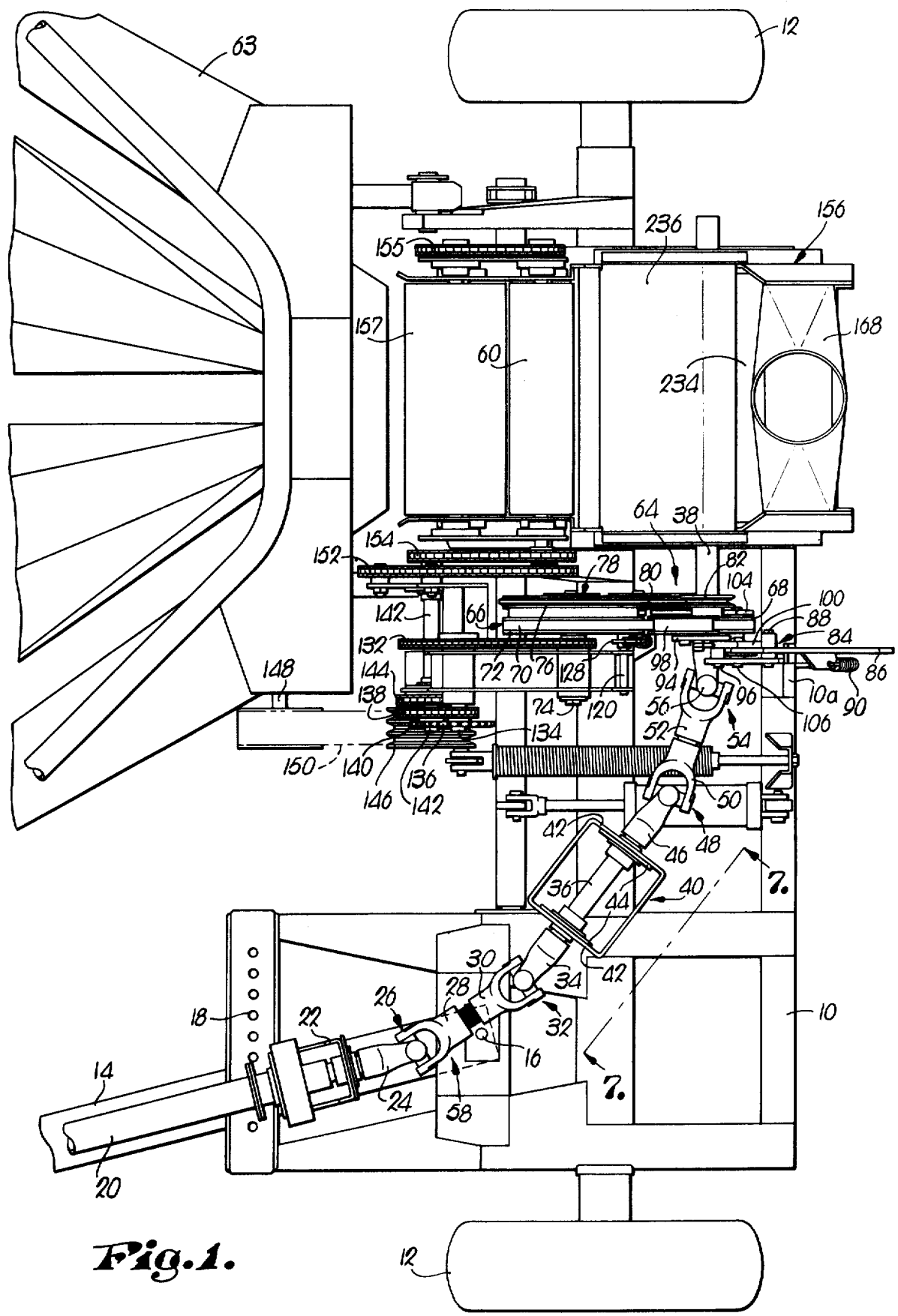
FIG. 1 is a fragmentary, top plan view of a forage harvester constructed in accordance with the principles of the present invention.

The harvester has a chassis 10 carried by wheels 12 for movement across a field, a fore-and-aft extending tongue 14 adapting chassis 10 for attachment to a towing vehicle (not shown). Tongue 14 is horizontally swingable about pivot 16 between a number of angular dispositions determined by insertion of pins (not shown) into registering holes 18 on chassis 10 and tongue 14 (the holes on tongue 14 not being shown).

A rigid drive shaft 20, which may lead from the power take-off of the towing vehicle, extends along tongue 14 and is supported for swinging movement with the latter by an upright support 22. The end of shaft 20 most adjacent the other part 28 being splined to one part 30 of a second universal joint 32 for rotation with but longitudinal displacement relative to the part 30. Joint 32 has its other part 34 fixed to a short shaft 36 extending at an approximate 38° angle across the approximate right angle between the tongue 14 and the main shaft 38 for the cutting apparatus of the harvester.

The diagonally extending shaft 36 is carried above chassis 10 by a tubular column 40 (FIGS. 1 and 7) having sidewalls 42 that are provided with bearings 44 which journal the shaft 36 for rotation about its longitudinal axis.

The end of shaft 36 opposite universal joint 32 carries one part 46 of a third universal joint 48, the other part 50 of joint 48 in turn being splined to one part 52 of a fourth universal joint 54. The other part 56 of the fourth universal joint 54 is splined to the outermost end of main shaft 38 such that driving power is supplied to the latter from drive shaft 20 and along a flexible drive line 58 defined by the series of universal joints 26, 32, 48 and 54. The longitudinal axes of drive shaft 20 and intermediate diagonal shaft 36 intersect at the axis of pivot 16 so that in all positions of swinging movement of tongue 14, there is no binding of drive line 58.

THE BELT TRANSMISSION

While the main shaft 38 (which carries the cutting cylinder yet to be described) is driven directly by the drive shaft 20 through flexible drive line 58 and therefore rotates at all times and in the same direction as shaft 20, it is desirable to have other components of the harvester, such as the feed rolls 60 and 62 (FIGS. 6 and 12) as well as gathering mechanism (not shown) carried by the row header 63 (FIG. 1) reversible relative to the main shaft 38 so as to expel any crops which may have become clogged in the machine. Consequently, the machine is provided with a reversible belt transmission denoted broadly by the numeral 64 and illustrated primarily in FIGS. 1-5.

A first belt and pulley power train 66 includes a large pulley member 68 (FIGS. 1 and 2) fixed to main shaft 38 adjacent the fourth universal joint 54, an outwardly and forwardly extending endless belt element 70 (FIGS. 1, 2, and 4), and a larger driven pulley member 72 which receives the upper looped end of belt 70. The large pulley 72 is fixed to a cross shaft 74, and shaft 74 carries a second large pulley member 76 (FIGS. 1, 3, and 5) which, in the form illustrated, is actually one-half of a double-track pulley secured to shaft 74, the first pulley 72 being the other half.

Pulley 76 is one member of a second power train 78 which also includes an endless flexible belt element 80 and a small pulley member 82 fixed to main shaft 38 adjacent the pulley 68. It is to be noted that unlike pulley 68, however, pulley 82 is not disposed within the normal loop of its drive belt 80 but is instead located to one side thereof as may be seen by comparing FIGS. 2 and 3.

Whether or not the belts 70 and 80 will be driven, and if so in what direction, is determined by clutch mechanism denoted broadly by the numeral 84. Part of the mechanism 84 is an actuating lever 86 that is swingable fore-and-aft about a transverse pivot 88, a tension spring 90 (FIGS. 1 and 2) yieldably biasing lever 86 to its rearmost position illustrated in solid lines in FIGS. 1 and 2. This corresponds to what will be referred to for convenience as the "forward mode" of transmission 64.

Another part of clutch mechanism 84 includes a belt tensioning component 92 that includes an arm 94 swingable about a transverse pivot 96 (FIGS. 2 and 4) on an upright 10a (FIG. 2) of chassis 10 and an idler 98 at the outer end of arm 94. A pusher link 100 (FIGS. 1, 2 and 4) interconnects arm 94 and lever 86 forwardly of the latter's pivot 88 so that, as lever 86 is swung to the left viewing FIGS. 2 and 4, link 100 lifts idler 98 from belt 70. Swinging lever 86 to the right causes link 100 to push idler 98 downwardly against belt 70. The latter condition is illustrated in FIG. 2, in which event belt 70 is entrained tightly enough around pulley 68 to receive driving power from the latter and to transmit the same to large pulley 72, thereby rotating shaft 74 in the same direction as main shaft 38. On the other hand, when idler 98 is lifted from belt 70 as illustrated in FIG. 4, belt 70 is allowed to slacken to such an extent that it simply remains motionless, having no effect on shaft 74, as pulley 68 rotates.

Another part of clutch mechanism 84 includes a unit 102 (FIGS. 2, 3 and 5) which is coupled with the actuating lever 86 in such a manner that unit 102 maintains belt 80 disengaged from pulley 82 (FIG. 3) when lever 86 is in its forward mode, but causes belt 80 to be back-wrapped around pulley 82 (FIGS. 4 and 5) when lever 86 is in its forward mode. Unit 102 has a normally downwardly extending arm 104 that is swingably mounted on upright 10a (FIG. 2) by a pivot 106 and an idler 108 carried at the outmost end of arm 104. As illustrated, idler 108 is always entrained by the lower loop of belt 80, and the position of idler 108 determines whether pulley 82 will be disengaged as shown in FIGS. 2 and 3 or back-wrapped as shown in FIGS. 4 and 5.

The actual connection to lever 86 is made through a downward extension 110 of lever 86 and a short length of chain 112 that connects the lower tip of extension 110 with a hub 114 of the arm 104. Hub 114 is rotatable about pivot 107 with arm 104, and the relationship of lever extension 110 with arm 104 when the latter is in its lowermost position as illustrated in FIGS. 2 and 3 is such that chain 112 is allowed to go slack. Thus, a lost motion connection is presented between unit 102 and lever 86 which requires the latter to be swung leftwardly to the phantom position in FIG. 2 from its forward mode before the slack is removed from chain 112. Further leftward swinging of lever 86 results in chain 112 pulling unit 102 counterclockwise viewing FIGS. 3 and 5 slightly more than 180° as idler 108 is moved from an approximate 7 o'clock position to an approximate 12 o'clock position back-wrapping the pulley 82.

Such back-wrapping of pulley 82 with belt 80 subjects the latter to the counterclockwise rotation of pulley 82 so that the big pulley 76, and hence cross shaft 74, is now driven in a clockwise direction as illustrated in FIG. 5.

Belt 80 is never slackened, regardless of the position of actuating lever 86. This is accomplished by virtue of the tensioning device 116 which forms yet another part of the clutch mechanism 84. Device 116 includes an elongated support 118 swingably mounted on chassis 10 by a transverse pivot 120 adjacent one of its ends. The device 116 further includes a pair of idlers 122 and 124 located at opposite ends of support 118, the belt 80 being wrapped in the normal manner about idler 124 but being back-wrapped about idler 122. A tension spring 126 connected to a hub 128 of support 118 through a chain 130 yieldably biases the device 116 toward the position illustrated in FIGS. 2 and 3.

When the actuating lever 86 is disposed in its forward mode, the idler 122 of device 116 is back-wrapped by belt 80 to its greatest extent as illustrated in FIG. 3. Swinging of lever 86 into its reverse mode, however, causes the upwardly swinging unit 102 to overcome the resistance of tension spring 126 and flip device 116 practically end-for-end about its pivot 120, thereby decreasing the back-wrapping of idler 122, "paying out" belt 80 to the unit 102, and allowing the latter to back-wrap the pulley 82. As lever 86 is returned to its forward mode, tension spring 126 flips the device 116 back to its original position to take up what would otherwise amount to slack in the belt 80.

It should be clear from the foregoing, then, that when the actuating lever 86 is in its forward mode as illustrated in FIG. 2, driving belt 70 is tensioned by idler 98 so that pulley 72 and shaft 74 rotate counterclockwise as does the main shaft 38. Belt 80 of power train 78 is maintained disengaged from pulley 82 at this time as illustrated in FIG. 3 so that pulley 82 has no effect on belt 80. But since pulley 76 of power train 78 is fixed to shaft 74, pulley 76 also rotates counterclockwise at this time. This means that belt 80 is driven by its pulley 76, and such activity on the part of belt 80 prevents any trash or crop residue from becoming lodged between it and its pulleys 76 or 82 such as might occur if belt 80 were loose during this interval. Any material that does happen to come in the vicinity of belt 80 and pulleys 76, 82 is immediately flung away by the moving component instead of being captured and accumulated.

If the transmission 64 is then to be placed in reverse mode, the lever 86 is swung forwardly to the position illustrated in FIG. 4 which removes the tension on belt 70 so that it simply idles loosely on its pulleys 72, 68, while the pulley 82 becomes back-wrapped by the belt 80 as illustrated in FIG. 5. This causes the two large pulleys 72, 76 to be rotated in a clockwise direction viewing FIGS. 4 and 5. Since the reverse mode is only infrequently utilized and even then for but very short intervals of time, the slack condition of belt 70 under these conditions is acceptable.

In the event that it is desired to place the transmission 64 in a neutral mode wherein both belts 70 and 80 are stationary, this can be accomplished by simply shifting the lever 86 to its phantom position illustrated in FIG. 2. In that condition, the lost motion provided by loose chain 112 enables the back-wrapping unit 102 to remain lowered in its FIG. 2 and FIG. 3 positions while the tensioning idler 98 is lifted from belt 70. Therefore, belt 70 becomes loose around pulley 68 so there is no drive from pulley 68 to shaft 74 through power train 66, and belt 80 remains disengaged from pulley 82, so there is no power to shaft 74 through power train 78. Consequently a neutral condition is achieved in which shaft 74 remains motionless in spite of the continued rotation of the main shaft 38.

Although forming no part of the present invention per se, it would be helpful to a full understanding of the invention to explain the manner in which forward or reverse rotation of shaft 74 is transmitted to the feed rolls 60, 62 of the harvester and the gathering chains (not shown) on header 63. In this regard, then, it will be seen that a chain and sprocket assembly 132 is driven by shaft 74 and extends forwardly therefrom. Assembly 132 in turn drives a short transverse shaft 134 (FIGS. 1 and 2) on which a reversable double sprocket 136 is fixed at the outer end. A chain 138 extends forwardly and downwardly from double sprocket 136 and drives a second double sprocket 140. It will be understood by those skilled in the art that sprockets 136 and 140 may be reversed in any combination so as to vary the speed of rotation of the jackshaft 142 which carries the double sprocket 140 and extends across the front of the machine.

One chain and sprocket assembly 144 takes power from jackshaft 142 and supplies it to a triple-track pulley 146 that in turn supplies power to a drive shaft 148 on header 64 for the gathering chains and sickle mechanism through belts 150.

Jackshaft 142 also supplies power to the feed rolls through a pair of chain and sprocket assemblies 152 and 154 illustrated most clearly in FIG. 4, the assembly 152 driving the lower rear feed roll 62 and the assembly 154 driving the upper rear feed roll 60. Other mechanism 155 (FIG. 1) on the opposite side of the machine drives the upper and lower front feed rolls by driving connections with the rear feed rolls 60, 62, only the upper front feed roll 157 being visable in FIG. 1.

THE CUTTING CYLINDER

The main shaft 38 leads from power transmission 64 into a cutting chamber 156 having opposite endwalls 158, an arcuate bottom wall or wrapper 160, a front wall 162 having an entry 164 for crops from feed rolls 60, 62, and a rear wall 166 which merges into the rear of an upright discharge spout 168 communicating with an outlet 170 in chamber 156 opposite to the inlet 164. A shear bar 172 traverses inlet 164 across and below the path of entering crops in the usual manner.

The chamber 156 receives a cutting cylinder 174 that is mounted on an enlargement 38a of shaft 38 for rotation with the latter. Three identical bulkhead units 176, 178 and 180 of cylinder 174 each carry a number of flat knife segments 182 at the periphery of cylinder 174; it is contemplated that they may each carry either eight of the knife segments 182 as illustrated in the drawings or twelve (not shown). The principles of operation remain the same in either case, however, and the constructional aspects are also practically the same.

Figure 9:
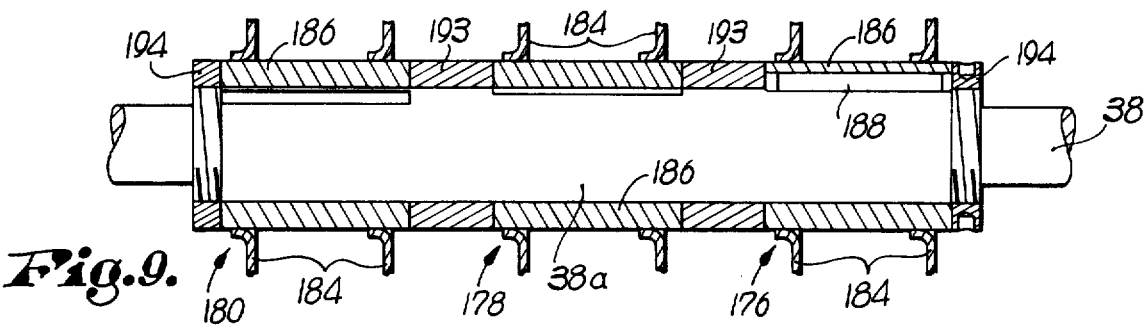
FIG. 9 is an enlarged, fragmentary detail view of the cutting cylinder illustrating the manner in which the bulkheads for the cutting knives are mounted on the rotor.
Figure 8:
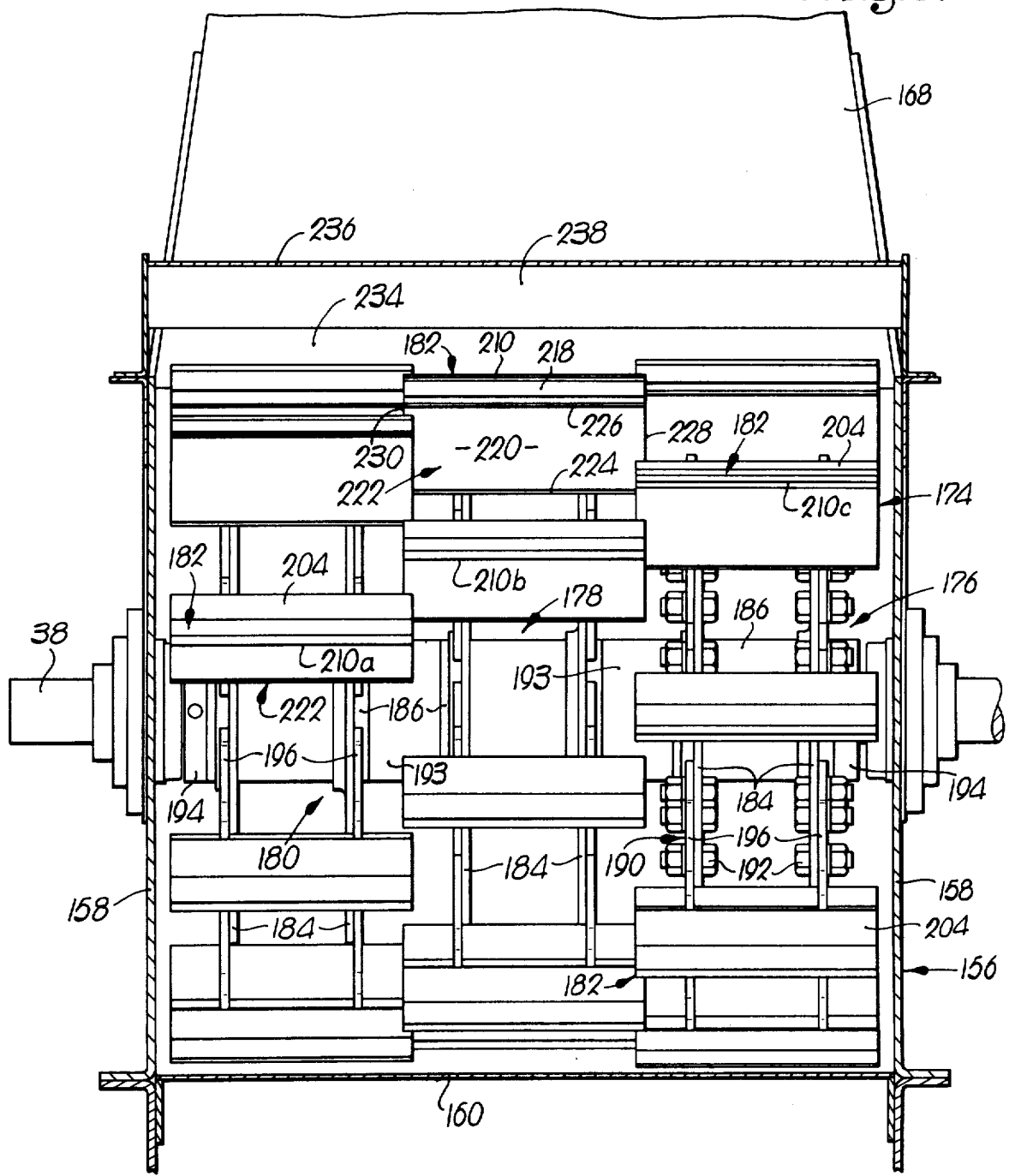
FIG. 8 is a frontal cross-sectional view through the cutting chamber taken along line 8—8 of FIG. 6.

In each case, a bulkhead unit 176, 178, or 180 has a pair of circular plates 184 that are rigidly secured such as be welding to a hub 186 keyed to enlargement 18a with a key 188 as illustrated in FIGS. 6 and 9. A number of radially extending mounts 190 are secured to the outer peripheries of plates 184 with bolts 192, the number and spacing of the mounts 190 around plates 184 determining the number of knife segments 182 that can be accommodated. The bulkhead units 176, 178 and 180 are keyed to enlargement 38a at circumferentially offset positions on the latter so that instead of the knife segments 182 lining up in a series parallel to the axis of rotation of cylinder 174, they are staggered relative to one another in a series that extends in a substantially helical line from end-to-end of cylinder 174 as illustrated in FIG. 8. The bulkhead units 176, 178 and 180 are spaced apart along enlargement 38a by spacing collars 193 shown in FIG. 9, and the entire assembly is held against axial displacement along enlargement 38a by a pair of retaining collars 194 threaded onto opposite ends of enlargement 38a.

Figure 10:
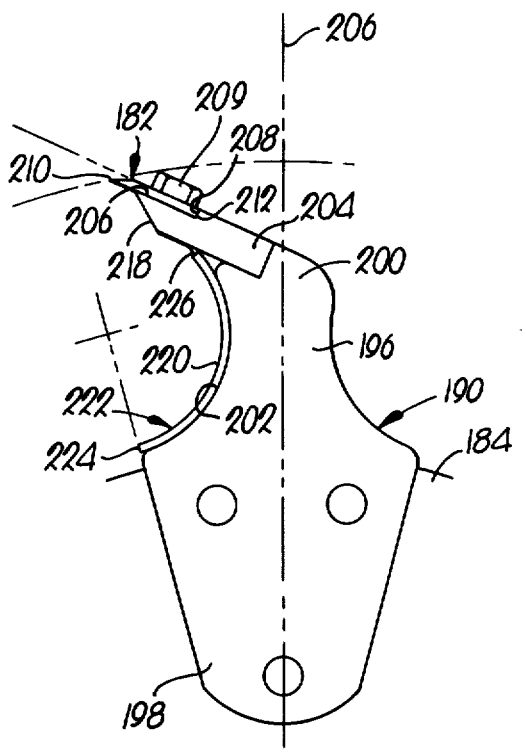
FIG. 10 is an enlarged, elevational view of a typical knife segment and its mounting arrangement.
Figure 11:
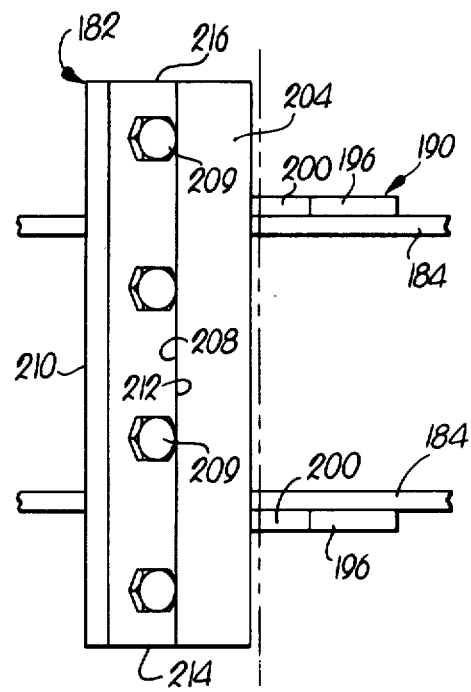
FIG. 11 is a plan view thereof.

As shown in detail in FIGS. 10 and 11, each mount 190 is in the form of a pair of identical flat, formed pieces 196 that are disposed on opposite plates 184 of a bulkhead unit and project radially outwardly beyond the periphery of plates 184. Each piece 196 has a radially inwardly tapering inner portion 198 that receives the bolts 192, and a necked outer portion 200 having a concave leading edge 202. A generally rectangular block 204 spans the necked portions 200 of each pair of mounting pieces 196 and is rigidly secured to the latter at an angle approximating 65° from the radially extending center line 206 of mount 190. A ledge 206 formed across the top of block 204 adjacent its leading edge provides a seat for the flat knife segment 182, and a shoulder 208 at the rear of ledge 206 provides a backstop. Screws 209 detachably secure the blade 182 in place.

The knife segments 182 are rectangular as perhaps shown best in FIGS. 8 and 11, each having a leading, beveled cutting edge 210 that extends parallel to the axis of rotation of cylinder 174, and a trailing edge 212 which is also parallel to the axis of cylinder 174 and which flatly abuts the shoulder 208 of block 204. Opposite parallel end edges 214 and 216 extend perpendicularly to the axis of cylinder 174.

Each block 204 is provided with a rearwardly sloping flat face 218 that is set back slightly from the cutting edge 210 of its knife segment 182 and which leads in an essentially unbroken path inwardly and rearwardly to the elongated, transversely concave, leading surface 220 of a cup 222 spanning the two mounting pieces 196 and complementally received by their concave edges 202. Each cup 222 is elongated as perhaps shown best in FIG. 8 and rectangular with its longitudinal axis extending parallel to the axis of rotation of cylinder 174. The inner and outer edges 224 and 226 respectively of each cup 22 extend parallel to knife edge 210, while its opposite, parallel end edges 228 and 230 extend perpendicularly to the knife edge 210. As also illustrated in FIG. 8, end edges 228, 230 of cups 222 and end edges 214, 226 of knife segments 182 of one bulkhead unit overlap corresponding parts in an adjacent bulkhead unit.

Figure 12:
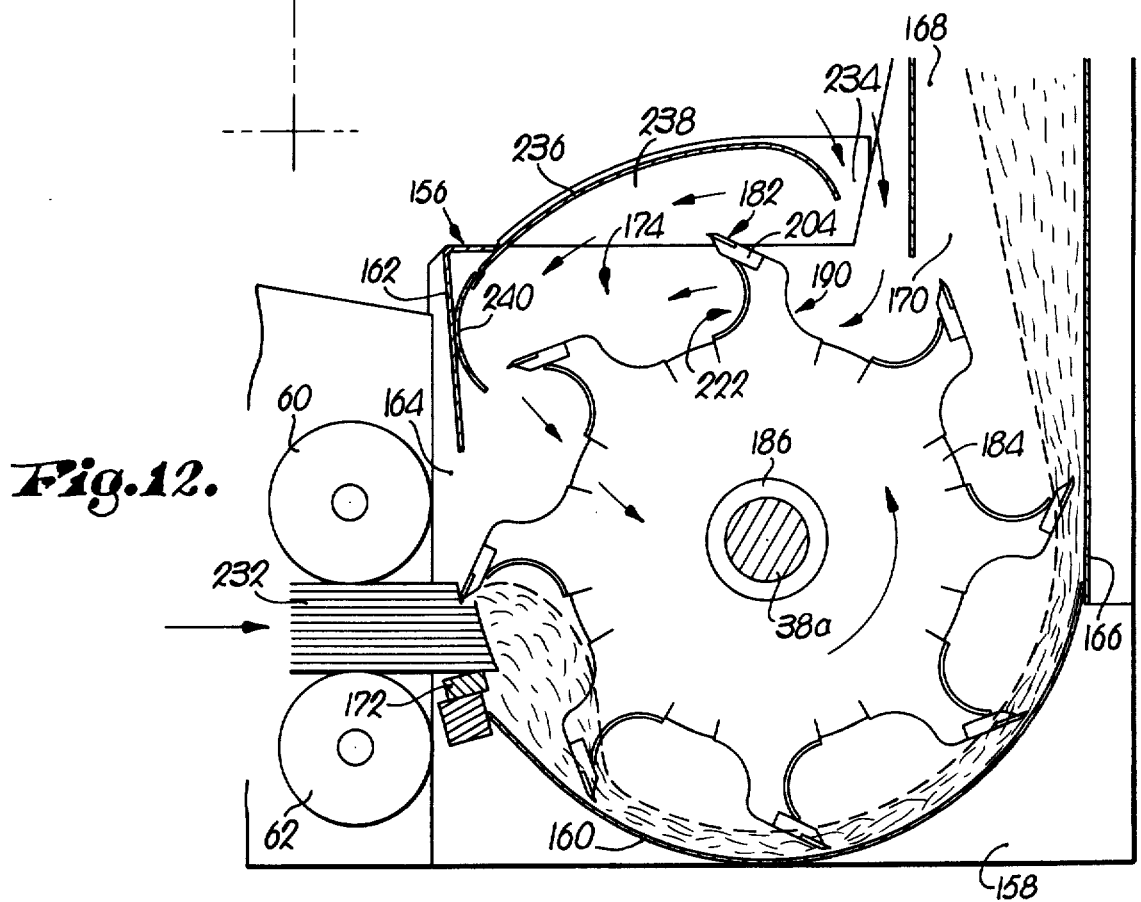
FIG. 12 is a schematic view on a reduced scale similar to FIG. 6 but with fewer knife segments and illustrating the manner in which incoming crops are severed by the cylinder and swept around the chamber to the discharge spout.

As a result of this overlapping relationship and the basically helical line of cutting edges 210 that is presented along the length of cylinder 174 such as exemplified by the cutting edges 210a, 210b and 210c in FIG. 8, an effective scissor-like shearing action is obtained as edges 210a, b, and c sweep downwardly past the shear bar 172 as illustrated in FIG. 12. Edge 210a makes the first engagement with the crops 232 entering inlet 164 and also the first cooperation with the shear bar 172 to effect the slicing rather than chopping action that is desired. Following edge 210a, the edges 210b and 210c sweep through the crops 232 in succession and progressively cooperate with the shear bar 172 to complete the effective shearing of the crops 232 into lengths determined by the rate of feed of the crops 232 by feed rolls 60, 62.

As the crops 232 are severed by the knife segments 182, their forward motion carries them inwardly toward the center of cutting cylinder 174, but they are prevented from entering deeply into the latter by cups 222 that gently redirect the crops back to the outside. Instead of entering cylinder 174, then, they are maintained about the periphery of the latter and are swept along bottom 160 of the chamber 156, rearwardly and upwardly through discharge outlet 170 into spout 168.

The crops are propelled with great velocity through the chamber 156 and out spout 168 so that there is no need for an auxiliary fan to assist in the discharge process. There are many reasons for the effectiveness of the cylinder 174 in this regard, including the various relationships between the blades 210, the mounting blocks 204, and the cups 222, the design of the cups 222 themselves, and the air flow pattern within chamber 156 yet to be described. With regard to the knife segments 182, blocks 204 and cups 222, note that the severed crops are not met by a flat impacting or slapping surface immediately following severance by the knife edges 210. Instead, the sloping faces 218 of mounting blocks 204 allow the severed crops to continue inwardly in a virtually unobstructed movement until their inward component of travel is gently diverted by the curved cups 222.

Thus, the effort required to spin the cylinder 174 is reduced from that necessary if power-robbing impacts were being made against the entering crop segments.

The cups 22 themselves prevent the severed crops from entering deeply into chamber 156 and flying wildly around against the walls of chamber 156 and the cylinder 174 itself, reducing operating efficiency. Instead, as illustrated clearly in FIG. 12, the severed crops are maintained by cups 222, at the very periphery of cylinder 174 following initial path deviation after severance, and in this peripheral disposition the severed crops are in ideal position to be released at discharge outlet 170 and propelled upwardly into the tangentially disposed discharge spout 168.

The attitude of cups 222 has a substantial bearing on the efficiency of cylinder 174. In this regard, it is emphasized that their longitudinal axes extend parallel to the axis of rotation of cylinder 174 and perpendicular to the path of travel of the entering crops 232 so that the entire thrust of the spinning cylinder 174 can be devoted to making the cut and throwing the crops rearwardly and upwardly into spout 168. If the longitudinal axes of te cups 222 were skewed or canted relative to the axis of rotation of cylinder 174, as is common on many conventional machines, at least a part of the energy of spinning cylinder 174 would be wasted in throwing the severed crops toward the endwalls 158 of chamber 156, thereby decreasing the operating efficiency of the machine.

It is to be noted that this attitude of the cups 222 is obtained in spite of the fact that a spiral or helical line of cutting surface is presented in cylinder 174 for acquiring the desirable scissor-like action. The segmentation of that cutting surface by the individual knife segments 182 enables the cups 222 to remain closely associated with the cutting surfaces and yet be disposed in the most desirable attitude for the highest operating efficiency.

The airflow within cutting chamber 156 is quite significant with respect to operating efficiency, and it has been found that the greatest efficiency can be obtained if an air intake is provided in chamber 156 immediately downstream from spout 168 with respect to the direction of rotation of cutting cylinder 174. Thus, such an intake 234 is illustrated immediately behind the removable top 236 of chamber 156. Air entering intake 234 is therefore moved through a travel of almost 360° before it is blasted up the spout 168 along with the severed crops.

It has been found that best results can be obtained if the chamber 156 is also provided with an enlarged air space 238 immediately downstream from intake 234 which then terminates immediately upstream from inlet 164. Preferably, an arcuate baffle 240 is located within chamber 156 just above inlet 164 to serve as the termination of air space 238 and to direct the airflow across inlet 164 and radially inwardly toward the center of cylinder 174. The result of this construction is a powerful yet firmly controlled airflow that augments the crop-throwing capabilities of cylinder 174 and substantially contributes to its operating efficiency.

FIGS. 13 and 14 illustrate that a slightly different arrangement of knife segments can be utilized without detracting from the operating efficiency of the machine. Here the knife segments, denoted by the numeral 242, are disposed slightly oblique with respect to the axis of rotation of the cylinder 174 instead of being parallel to the latter as their counterpart segments 182. Thus, a slightly truer helical cutting surface is presented by the segments 242a, 242b and 242c illustrated in FIG. 14 along the length of cylinder 174 than with knife segments 182. While the end edges 244 and 246 of knife segments 242 remain perpendicular to the axis of rotation of cylinder 174, the parallel cutting edges 248 and trailing edges 250 are disposed in the oblique relationship. The mounting blocks 252 and the mounts 254 themselves are modified slightly to accommodate this oblique relationship, but in most respects remain the same as their earlier described counterparts.

Most importantly, while the cups 256 are deformed slightly along their leading edges 258 as illustrated in FIG. 13 in order to blend in smoothly with blocks 252, the longitudintal axes of cups 256 remain parallel to the axis of rotation of te cylinder 174 and perpendicular to the path of travel of the entering crops 232. Hence, the cups 256 have no tendency to throw the severed crops laterally against the end walls 158 of chamber 156, to the end that operating efficiency is maximized.

Having thus described the invention, what is claimed as new and desired to be secured by Letters Patent is:

1. In a power transmission:
   a first power train including a first rotatable driven member and a first endless, flexible element entraining said first member;
   a second power train including a second rotatable driven member, mounted for rotation with said first member about a common axis, and a second endless, flexible element entraining said second member; and
   clutch mechanism shiftable between a first position driving the members and both elements in one direction and a second position driving the members and said second element in the opposite direction while said first element remains idle.

2. In a power transmission as claimed in claim 1, wherein said first and second power trains include first and second drive members respectively mounted for rotation in unison about a common axis.

3. In a power transmission as claimed in claim 2, wherein said first element entrains said first drive member and said mechanism includes a component for tensioning the first element about said first members when the mechanism is in said first position and for relaxing the first element about said first members when in its second position.

4. In a power transmission as claimed in claim 3, wherein said mechanism further includes a unit for back-wrapping said second element around said second drive member when said first element is relaxed and for disengaging the second element from said second drive member when the first element is tensioned.

5. In a power transmission as claimed in claim 4, wherein said mechanism further includes a device for maintaining tension on said second element when the latter is disengaged from said second drive member.

6. In a power transmission as claimed in claim 5, wherein said device includes a pair of laterally spaced idlers rotatably mounted on a common support, said second element being back-wrapped around one of said idlers and said support being swingable between a position decreasing the back-wrap of said one idler when said second drive member is back-wrapped and a position increasing the back-wrap of said one idler when said second drive member is disengaged by the second element.

7. In a power transmission as claimed in claim 6, wherein said support is provided with means yieldably biasing the same toward its position of increased idler back-wrap.

8. In a power transmission as claimed in claim 7, wherein said support is coupled with said back-wrapping unit through said second element for swinging the support in response to operation of said unit.

9. In a power transmission as claimed in claim 4, wherein said back-wrapping unit and said tensioning component are provided with a common swingable actuator.

10. In a power transmission as claimed in claim 9, wherein said component includes a swingable arm coupled with said actuator for movement toward and away from said first element in response to swinging of said actuator, said unit including a second swingable arm coupled with said actuator for moving said second element into and out of its back-wrapping relationship with said second drive member in response to swinging of said actuator.

11. In a power transmission as claimed in claim 10, wherein said actuator and said arm of the unit are intercoupled through a lost motion connection for swinging of the actuator to a position wherein said first element is relaxed and said second element is disengaged from said second drive member.

12. In a power transmission as claimed in claim 10, wherein said actuator is provided with means yieldably biasing the same toward a disposition maintaining said first element tensioned and said second element disengaged from said second drive member.

13. In a power transmission as claimed in claim 1, wherein said mechanism is provided with means yieldably biasing the same toward said first position thereof.

14. In a power transmission as claimed in claim 1, wherein said mechanism is shiftable to a third position idling the members and both elements.

15. In a power transmission:
   a first power train including a first rotatable drive member, a first rotatable driven member and a first endless, flexible element entraining said first driven member;
   a second power train including a second rotatable drive member, a second rotatable driven member, mounted for rotation with said first driven member about a common axis, and a second endless, flexible element entraining said second driven member; and
   clutch mechanism shiftable between a pair of alternate positions,
   said mechanism in a first of said positions causing said first drive member to drive both of said driven members and both of said element in one direction,
   said mechanism in a second of said positions causing said second drive member to drive both of said driven members and at least said second element in the opposite direction while neither of the elements is driven by said first drive member.

16. In a power transmission as claimed in claim 15, wherein said mechanism is operable to render said first element substantially idle when the mechanism is in said second position.

17. In a power transmission as claimed in claim 15, wherein siad first and second drive members are mounted for rotation in unison and in the same direction about a common axis.

18. In a power transmission as claimed in claim 17, wherein said first element entrains said first drive member and said mechanism includes a component for tensioning the first element about said first members when the mechanism is in said first position and for relaxing the first element about said first members when in its second position.

19. In a power transmission as claimed in claim 18, wherein said mechanism further includes a unit for back-wrapping said second element around said drive member when said first element is relaxed and for disengaging the second element from said second drive member when the first element is tensioned.

* * * * *